US012611078B2

(12) United States Patent (10) Patent No.: US 12,611,078 B2
Choi et al. (45) Date of Patent: Apr. 28, 2026

(54) ROBOT CLEANER

(71) Applicant: SAMSUNG ELECTRONICS CO., LTD., Suwon-si (KR)

(72) Inventors: Sewoong Choi, Suwon-si (KR); Youngho Ko, Suwon-si (KR); Kihwan Kwon, Suwon-si (KR); Seokki Song, Suwon-si (KR); Jaeyoul Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 295 days.

(21) Appl. No.: 18/456,903

(22) Filed: Aug. 28, 2023

(65) Prior Publication Data

US 2024/0057829 A1    Feb. 22, 2024

Related U.S. Application Data

(63) Continuation of application No. PCT/KR2023/012067, filed on Aug. 16, 2023.

(30) Foreign Application Priority Data

Aug. 22, 2022    (KR) ........................ 10-2022-0105091
Jul. 18, 2023    (KR) ........................ 10-2023-0093449

(51) Int. Cl.
*A47L 9/00*         (2006.01)
*B60C 11/03*        (2006.01)
(52) U.S. Cl.
CPC ........... *A47L 9/009* (2013.01); *B60C 11/0311* (2013.01); *A47L 2201/04* (2013.01)

(58) Field of Classification Search
CPC ... A47L 9/009; A47L 2201/04; B60C 11/0311
See application file for complete search history.

(56) References Cited

U.S. PATENT DOCUMENTS 6,845,796 B2    1/2005  Katoh et al.
8,714,220 B2    5/2014  Tso et al.
(Continued)

FOREIGN PATENT DOCUMENTS

CN        109567682 A      4/2019
CN        213167601 U      5/2021
(Continued)

OTHER PUBLICATIONS

International Search Report issued in International Application No. PCT/KR2023/012067 dated Dec. 12, 2023.
(Continued)

*Primary Examiner* — Erick R Solis
(74) *Attorney, Agent, or Firm* — STAAS & HALSEY LLP

(57)    ABSTRACT

A robot cleaner includes a main body and a wheel installed on the main body and configured to be driven by a driving motor to move the main body. The wheel includes an outer wheel including a tread configured to come into contact with a cleaning target floor and sidewalls provided on both side surfaces of the tread, and an inner wheel installed in the outer wheel and configured to receive a driving force from the driving motor. The outer wheel includes a plurality of tread grooves recessed in the tread. The outer wheel includes a plurality of deforming grooves formed in an axial direction of the outer wheel at positions corresponding to the plurality of tread grooves.

18 Claims, 12 Drawing Sheets

(56)                          References Cited

U.S. PATENT DOCUMENTS

| | | | | |
|---|---|---|---|---|
| 10,390,669 | B2 | 8/2019 | Kim | |
| 10,500,894 | B2 | 12/2019 | Park et al. | |
| 11,731,458 | B2 | 8/2023 | Sgreccia et al. | |
| 2017/0100007 | A1* | 4/2017 | Matsumoto | A47L 9/0472 |
| 2018/0078106 | A1* | 3/2018 | Scholten | A47L 9/009 |
| 2020/0298415 | A1* | 9/2020 | Sun | A47L 9/16 |
| 2020/0383547 | A1 | 12/2020 | Sutter et al. | |
| 2023/0320547 | A1* | 10/2023 | Lee | B60C 7/10 |
| | | | | 180/65.51 |

FOREIGN PATENT DOCUMENTS

| | | | |
|---|---|---|---|
| CN | 113771556 | A | 12/2021 |
| CN | 215662788 | U | 1/2022 |
| CN | 114569010 | A | 6/2022 |
| JP | 05-77605 | | 3/1993 |
| JP | 4072708 | | 4/2008 |
| JP | 3169183 | | 6/2011 |
| JP | 2021-519721 | | 8/2021 |
| KR | 10-2016-0001394 | | 1/2016 |
| KR | 10-2017-0075165 | | 7/2017 |
| KR | 10-1789407 | | 10/2017 |

OTHER PUBLICATIONS

Written Opinion issued in International Application No. PCT/KR2023/012067 dated Dec. 12, 2023.

* cited by examiner

ROBOT CLEANER

CROSS-REFERENCE TO RELATED APPLICATION

This application is a continuation application of International Application No. PCT/KR2023/012067, filed on Aug. 16, 2023, which claims priority benefit of Korean Patent Application No. 10-2022-0105091, filed on Aug. 22, 2022 and Korean Patent Application No. 10-2023-0093449, filed on Jul. 18, 2023 in the Korean Intellectual Property Office, the disclosures of each of which is incorporated herein by reference.

BACKGROUND

1. Field

Embodiments of the present disclosure relate to a robot cleaner including improved wheels to improve both travel performance and obstacle climbing performance.

2. Description of the Related Art

In general, robot cleaners are apparatuses which automatically clean cleaning target areas by suctioning foreign matter such as dust from cleaning target floors while traveling the cleaning target areas by themselves without users' manipulation.

A robot cleaner cleans a cleaning area while detecting a distance to obstacles such as furniture, office supplies, walls, and thresholds installed in the cleaning area using various sensors and traveling not to collide with the obstacles using detected information.

The robot cleaner includes wheels for driving a robot cleaner main body, and the wheels drive the robot cleaner main body using a frictional force generated between the wheels and a cleaning target floor in contact with the wheel.

SUMMARY

Therefore, it is an aspect of the present disclosure to provide a robot cleaner in which patterns formed in a tread of a wheel are connected in a circumferential direction of a wheel so that the tread of the wheel always comes into line contact with a cleaning target floor so as to improve travel performance.

In addition, it is an aspect of the present disclosure to provide a robot cleaner in which a groove is formed in a side surface of a wheel in an axial direction of the wheel to travel by climbing over an obstacle such as a threshold without an additional algorithm capable of detecting and traveling on the obstacle such as the threshold.

Technical objectives to be addressed through the present disclosure are not limited to the above-described objectives, and other objectives which are not mentioned above will be clearly understood by those skilled in the art through the following specification.

In accordance with one aspect of the present disclosure, a robot cleaner includes a main body and a wheel installed on the main body and configured to be driven by a driving motor to move the main body. The wheel may include an outer wheel configured to come into contact with a cleaning target floor, the outer wheel including a tread configured to come into contact with the cleaning target floor, a sidewall provided on both side surfaces of the tread, respectively, the sidewall including a first sidewall and a second sidewall, a plurality of tread grooves recessed in the tread and provided alternately with a side of a first tread groove opening toward the first sidewall and a side of a second tread groove opening toward the second sidewall, and a plurality of deforming grooves formed in the outer wheel in an axial direction of the outer wheel at positions corresponding to the first tread groove and the second tread groove, and an inner wheel installed in the outer wheel and configured to receive a driving force from the driving motor, An end portion of each deforming groove of the plurality of deforming grooves in the axial direction of the outer wheel may be formed to be inclined so that a height of the end portion from a lower surface of each deforming groove of the plurality of the deforming grooves decreases gradually.

The first tread groove may include a first opening on the side that opens toward the first sidewall and the second tread groove may include a second opening on the side that opens toward the first sidewall.

In the first tread groove and the second tread groove, an end portion of an other side of the first opening and an other side of the second opening, in the axial direction of the outer wheel, may be inclined to have a slope corresponding to the end portion of each deforming groove of the plurality of deforming grooves, respectively.

The plurality of deforming grooves may be formed in the first sidewall and the second sidewall, respectively.

Among the plurality of deforming grooves, a deforming groove formed at a position corresponding to the first tread groove may be formed in the second sidewall, and a deforming groove formed at a position corresponding to the second tread groove may be formed in the first sidewall.

A length of each deforming groove of the plurality of deforming grooves in a circumferential direction of the outer wheel may be greater than a length of each tread groove of the plurality of tread grooves in the circumferential direction.

Each tread groove of the plurality of tread grooves may extend in the axial direction of the outer wheel to be longer than half of a width of the outer wheel.

Each deforming groove of the plurality of deforming grooves may extend in the axial direction of the outer wheel to have a length shorter than half of a width of the outer wheel.

The outer wheel may be deformed due to each deforming groove of the plurality of deforming grooves formed at a position corresponding to each tread groove of the plurality of tread grooves, so that an obstacle may be partially accommodatable in the tread groove while the wheel climbs over the obstacle.

The outer wheel may be deformed toward only one side of both side surfaces of the outer wheel at which the deforming groove is formed.

The outer wheel may include a shoulder at which the first and second sidewalls are changed to the tread, and the plurality of deforming grooves may be formed not to intersect the shoulder.

Each of the plurality of tread grooves may have a quadrangular shape.

Each of the plurality of tread grooves may have a triangular shape.

Each of the plurality of deforming grooves may have a quadrangular cross section.

In accordance with another aspect of the present disclosure, a robot cleaner includes a main body and a wheel installed on the main body and configured to be driven by a driving motor to move the main body. The wheel may include a tread configured to come into contact with a cleaning target floor, a sidewall provided on both side surfaces of the tread, respectively, the sidewall including a first sidewall and a second sidewall, a plurality of tread grooves recessed in the tread and provided alternately with a side of a first tread groove opening of the plurality tread grooves toward the first sidewall and a side of a second tread groove of the plurality of tread grooves opening toward the second sidewall, and a plurality of deforming grooves formed in both side surfaces of the wheel in an axial direction of the wheel and formed at positions respectively corresponding to the plurality of tread grooves in the axial direction of the wheel.

An end portion of each deforming groove of the plurality of deforming grooves in the axial direction of the wheel may be formed to be inclined so that a height of the end portion decreases gradually; and each tread groove of the plurality of tread grooves may be formed so that a side of the tread groove opens in the axial direction of the wheel, and an end portion of an other side of the tread groove in the axial direction of the wheel is formed to be inclined to have a slope corresponding to the end portion of the deforming groove.

The plurality of deforming grooves may be formed in the first sidewall and the second sidewall, respectively.

As a length of each deforming groove of the plurality of deforming grooves extending in the axial direction of the wheel increases, a length of each tread groove of the plurality of tread grooves extending in the axial direction of the wheel may decrease.

Based on a circumferential direction of the wheel, a length of each deforming groove of the plurality of deforming grooves may be greater than or equal to a length of each tread groove of the plurality of tread grooves.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
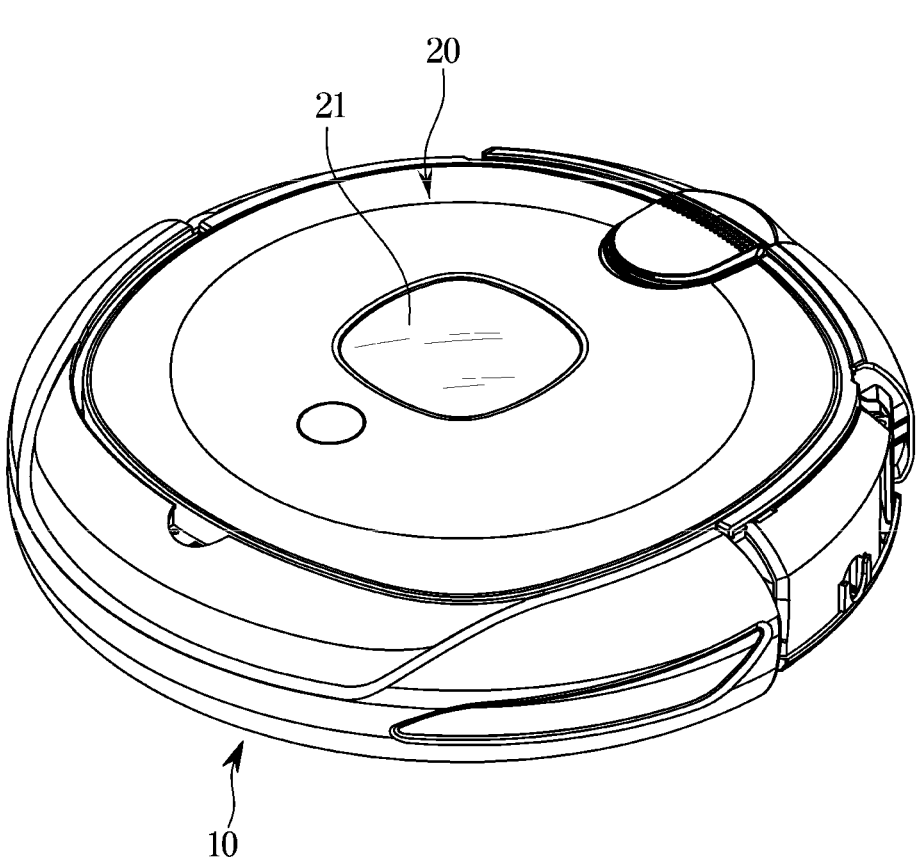
FIG. 1 is a perspective view illustrating a robot cleaner according to one embodiment.

Embodiments described in the present specification and configurations illustrated in the accompanying drawings are only exemplary examples of the disclosed disclosure. The disclosure may have variously modified embodiments which may substitute for the embodiments and drawings of the present specification at the time of filing of this application.

In addition, the same reference numerals or symbols refer to parts or components which substantially perform the same function.

In addition, terms used in the present specification are merely used to describe exemplary embodiments and are not intended to limit and/or restrict the embodiments. An expression used in the singular encompasses the expression of the plural unless it has a clearly different meaning in context. In the present specification, terms such as "including," "having," or "comprising" are intended to indicate the presence of the features, numbers, steps, actions, components, parts, or combinations thereof described in the specification, and are not intended to preclude the possibility which one or more other features, numbers, steps, actions, components, parts, or combinations thereof may be present or added.

In addition, it should be understood that, although the terms "first," "second," and the like may be used in the present specification to describe various components, these components should not be limited by these terms. These terms are only used to distinguish one component from another component. For example, a first component could be called a second component, and, similarly, a second component could be called a first component without departing from the scope of the present disclosure. As used herein, the term "and/or" includes any one or combinations of the associated listed items.

Meanwhile, terms used in the specification such as "front end," "rear end," "upper portion," "lower portion," "upper end," and "lower end" are defined based on the drawings, and shapes and positions of components are not limited by the terms.

Hereinafter, embodiments according to the present disclosure will be described in detail with reference to the accompanying drawings.

Figure 2:
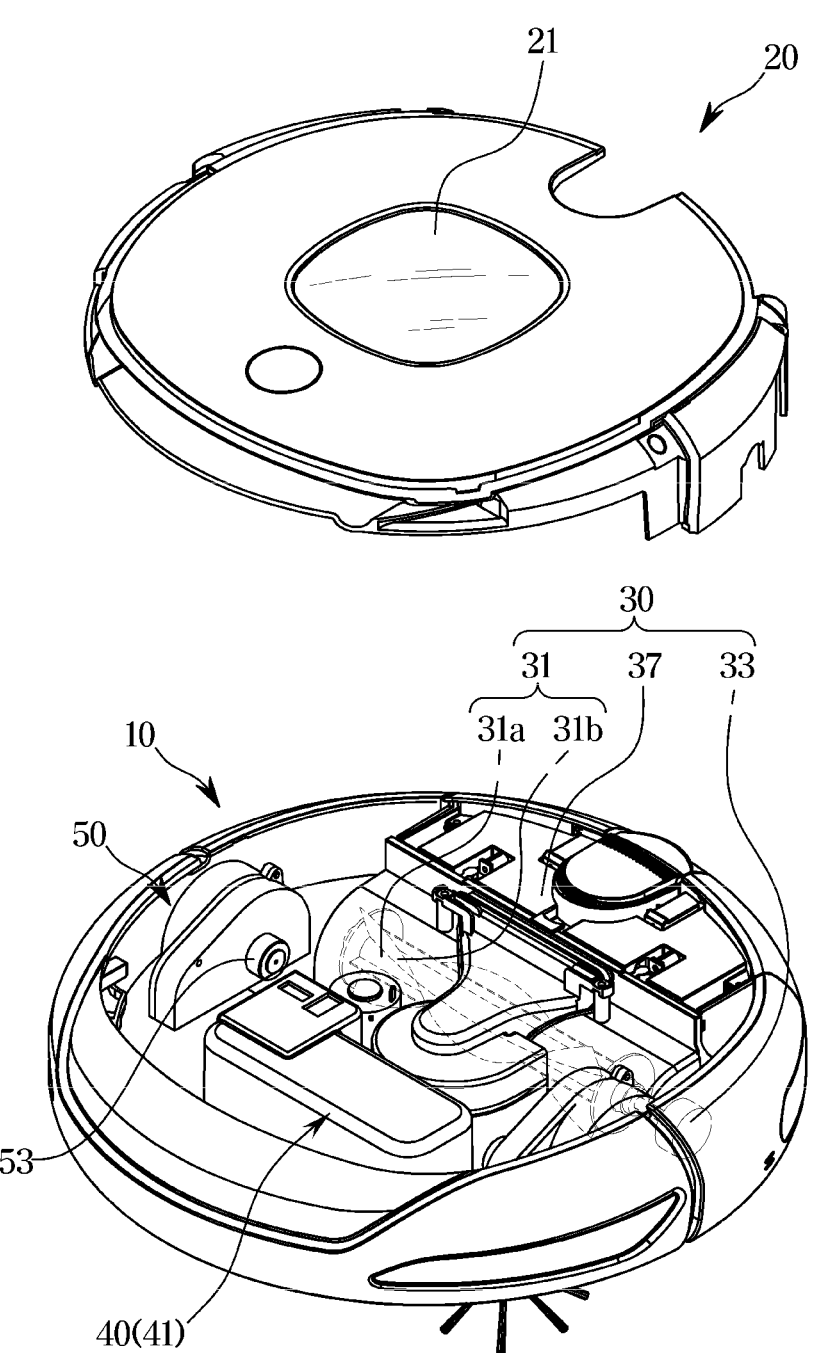
FIG. 2 is a view illustrating a main body separated from a cover of the robot cleaner according to one embodiment.
Figure 3:
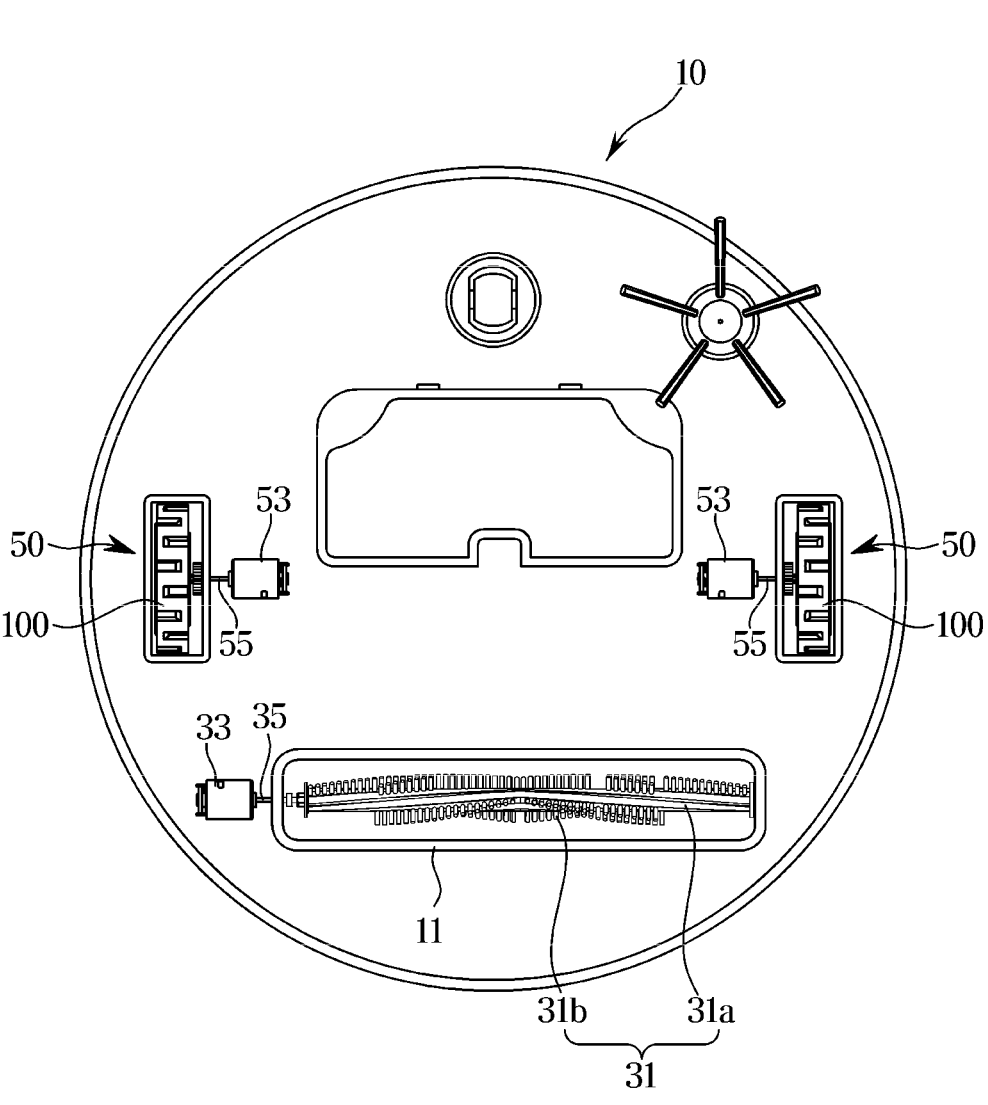
FIG. 3 is a view illustrating a lower surface of the robot cleaner according to one embodiment.

FIG. 1 is a perspective view illustrating a robot cleaner according to one embodiment. FIG. 2 is a view illustrating a main body separated from a cover of the robot cleaner according to one embodiment. FIG. 3 is a view illustrating a lower surface of the robot cleaner according to one embodiment.

As illustrated in FIGS. 1 to 3, the robot cleaner includes a main body 10, a cover 20 which covers an upper portion of the main body 10, a brush unit 30 configured to sweep or scatter dust in a cleaning space, a power supply 40 configured to supply driving power for driving the main body 10, and a driving apparatus 50 configured to move the main body 10.

The main body 10 may form an exterior of the robot cleaner and support various components installed in the main body 10.

The cover 20 may include a transmission window 21 which transmits light generated by an upper camera unit (not shown) for capturing an image of an upper side perpendicular to a traveling direction of the main body 10.

The brush unit 30 includes a main brush 31 mounted in an inlet port 11 formed in a rear lower portion of the main body 10, a main brush motor 33 configured to rotate the main brush 31, a rotating shaft 35 coupled to the main brush 31 and configured to receive a rotational force of the main brush motor 33 to rotate the main brush 31, and a dust container 37 configured to collect foreign matter such as dust collected by the main brush 31.

The main brush 31 can improve dust suction efficiency by sweeping or scattering dust on a floor surface under the main body 10. The main brush 31 may have a drum shape and may be provided with a roller 31a and a brush 31b.

Although not shown in the drawings, the brush unit 30 may further include side brushes (not shown) disposed at both sides of the main brush 31 to sweep dust in area in which the main brush 31 cannot sweep the dust to improve cleaning efficiency.

The main brush motor 33 may generate a rotational force to rotate the roller 31a of the main brush 31. The main brush motor 33 and the main brush 31 may be connected through the rotating shaft 35, and the rotational force of the main brush motor 33 may be transmitted to the main brush 31.

The power supply 40 may include a battery 41 electrically connected to a driving motor 53 configured to rotate the driving apparatus 50, the main brush motor 33 configured to rotate the main brush 31, and various drivers for driving the remaining parts of the main body 10 to supply driving power thereto. The battery 41 may be provided as a rechargeable secondary battery. The battery 41 may be charged by receiving power from a docking station (not shown) when the main body 10 completes a cleaning process and is coupled to the docking station.

The driving apparatus 50 may be rotated by the driving motor 53 so that the main body 10 moves for cleaning. The driving apparatus 50 may include wheels 100 installed on the main body 10 to move the main body 10, the driving motor 53 configured to generate a rotational force to rotate the wheel 100, and a driving shaft 55 configured to receive the rotational force of the driving motor 53 to rotate the wheel 100. The driving motor 53 and the wheel 100 may be connected through the driving shaft 55 to transmit the rotational force of the driving motor 53 to the wheel 100.

Figure 4:
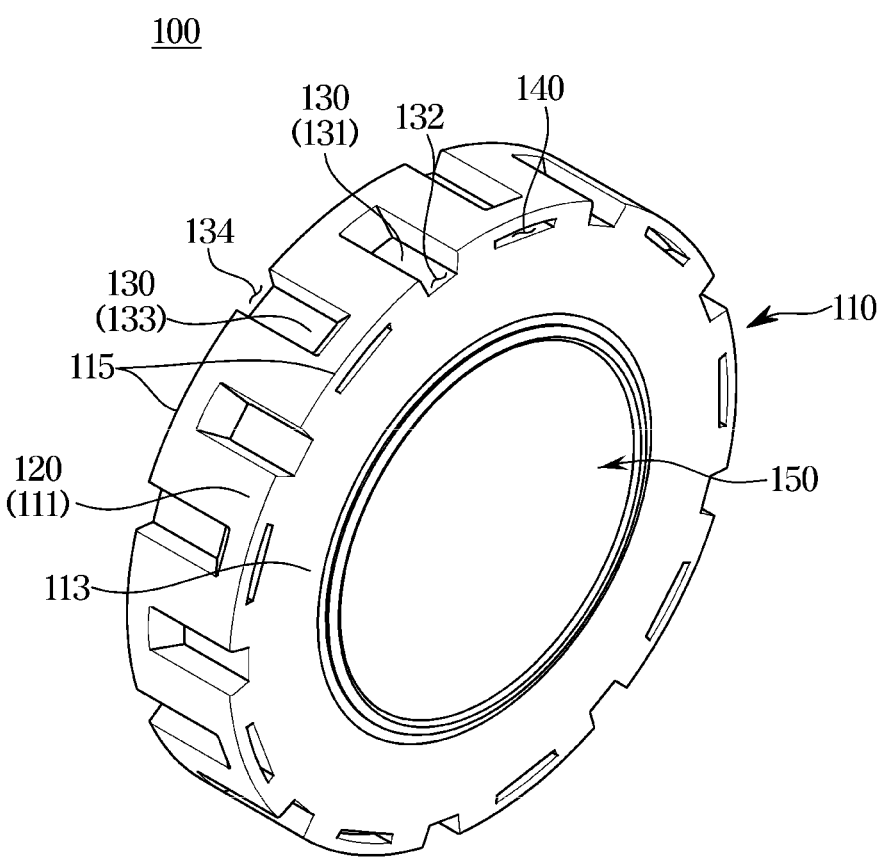
FIG. 4 is a perspective view illustrating a wheel according to one embodiment.
Figure 5:
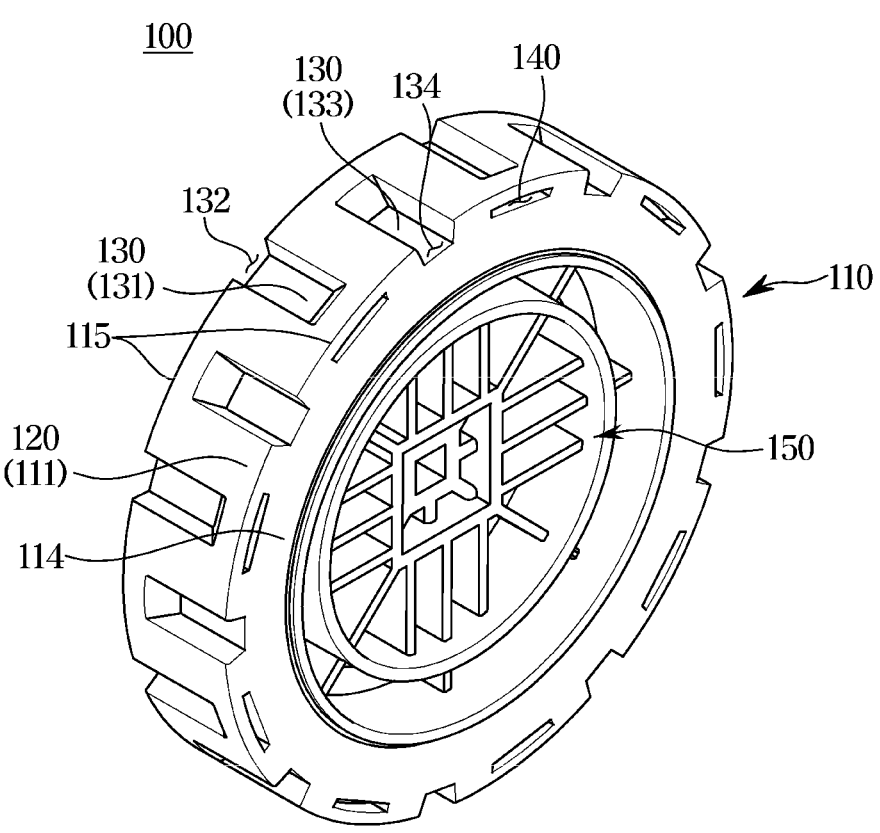
FIG. 5 is a perspective view illustrating another side surface of the wheel illustrated in FIG. 4.
Figure 6:
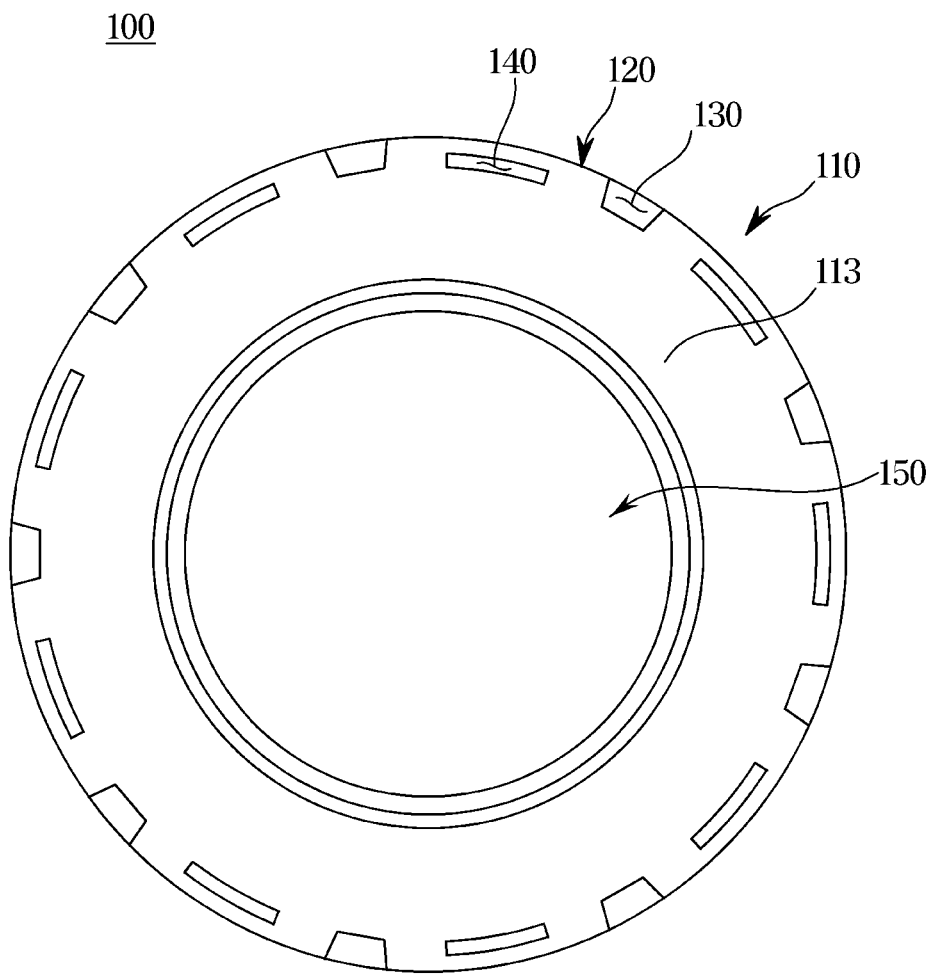
FIG. 6 is a view illustrating a side surface of the wheel according to one embodiment.
Figure 7:
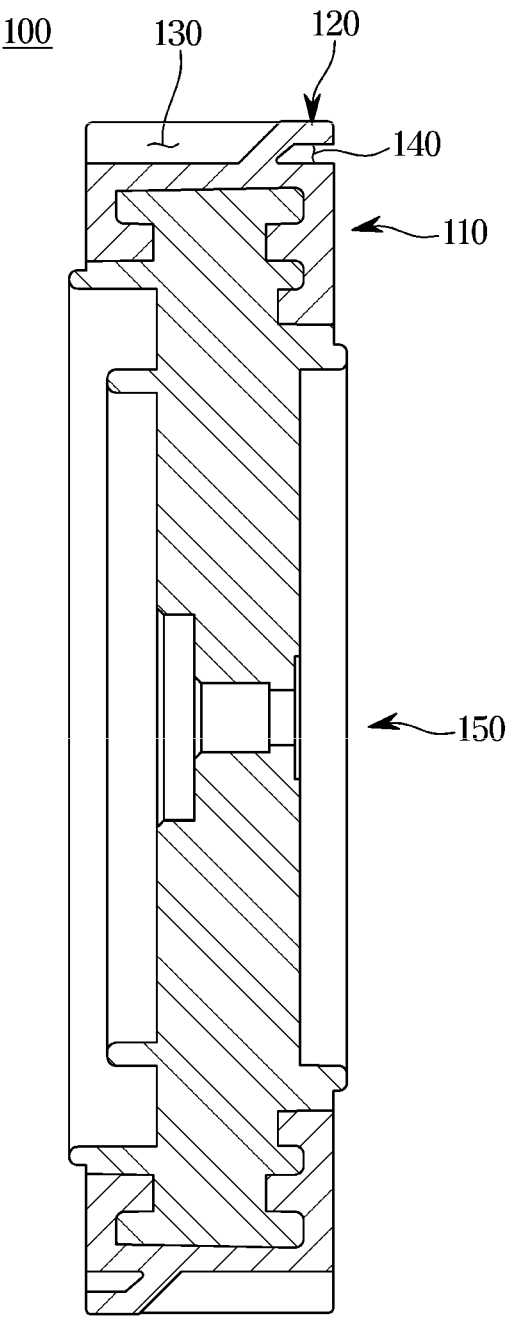
FIG. 7 is a cross-sectional view illustrating the wheel according to one embodiment.

FIG. 4 is a perspective view illustrating the wheel according to one embodiment. FIG. 5 is a perspective view illustrating another side surface of the wheel illustrated in FIG. 4. FIG. 6 is a view illustrating a side surface of the wheel according to one embodiment. FIG. 7 is a cross-sectional view illustrating the wheel according to one embodiment.

As illustrated in FIGS. 4 to 7, the wheel 100 may include an outer wheel 110 configured to come into contact with a cleaning target floor and an inner wheel 150 installed in the outer wheel 110 and configured to receive a driving force from the driving motor 53 (see FIGS. 2 and 3).

The outer wheel 110 may be formed as a tire. The outer wheel 110 may include a tread 111 configured to come into contact with the cleaning target floor. That is, the tread 111 may be a surface of the tire configured to come into contact with the cleaning target floor. The tread 111 may be an outer circumferential surface of the outer wheel 110.

The outer wheel 110 may include sidewalls 113 and 114 provided on both side surfaces of the tread 111. The sidewall may be provided as a pair of sidewalls 113 and 114 and each provided on one of the side surfaces of the tread 111. The sidewalls 113 and 114 may include the first sidewall 113 and the second sidewall 114 and each provided on one of the side surfaces of the tread 111. The outer wheel 110 may include shoulders 115 at which the sidewalls 113 and 114 are changed to the tread 111. That is, the shoulders 115 may be edges of the tread 111 and also be edges of the sidewalls 113.

The outer wheel 110 may include tread patterns 120 formed on the tread 111 to be connected in a circumferential direction. When the tread pattern 120 is formed on the tread 111, since the tread pattern 120 comes into contact with the cleaning target floor, the tread pattern 120 may be the tread 111. The tread pattern 120 may be formed by a plurality of tread grooves 130 that are recessed in the tread 111. Since the tread patterns 120 configured to come into contact with the cleaning target floor are formed on the tread 111 to be connected in the circumferential direction, the wheel 100 may always come into contact with the cleaning target floor. Accordingly, high travel performance of the robot cleaner can be provided even in a situation of a low friction coefficient between the wheel 100 and the cleaning target floor. That is, since the wheel 100 always comes into contact with the cleaning target floor through the tread pattern 120 even in a slippery state due to water on the cleaning target floor, the robot cleaner can have high travel performance.

To describe the robot cleaner in detail again, the robot cleaner may be used for dry cleaning and wet cleaning, and when the robot cleaner is used for dry cleaning, since the cleaning target floor is not slippery, even when the wheel 100 does not always come into contact with the cleaning target floor, a friction coefficient is high, and thus the robot cleaner can travel without slipping. When the robot cleaner is used for wet cleaning, since the cleaning target floor is slippery due to water on the cleaning target floor, the friction coefficient is lowered, and thus the wheel 100 may slide. However, since the wheel 100 always comes into contact with the cleaning target floor due to the tread patterns 120 formed on the tread 111 to be connected in the circumferential direction, the wheel 100 can allow the robot cleaner to move without slipping.

The outer wheel 110 may include the plurality of tread grooves 130 formed to be recessed in the tread 111. The plurality of tread grooves 130 may be formed to be recessed in the radial direction of the outer wheel 110. Each of the plurality of tread grooves 130 may be formed to have a quadrangular shape. The tread pattern 120 formed on the tread 111 by the plurality of tread grooves 130 may have a shape alternately connected to the first and second sidewalls 113 and 114 provided on both side surfaces of the outer wheel 110, respectively.

Each of the plurality of tread grooves 130 may be formed so that one side opens in an axial direction of the outer wheel 110. In one side surface of the outer wheel 110, each of the plurality of tread grooves 130 may be formed so that one side opens in the axial direction of the outer wheel 110, and the other side does not open in the axial direction of the outer wheel 110. That is, each of the plurality of tread grooves 130 may be formed so that a length in the axial direction of the outer wheel 110 is smaller than a width of the tread 111. Each of the plurality of tread grooves 130 may be formed to have a length shorter than the width of the tread 111, which is a width of the outer wheel 110, and longer than half of the width of the outer wheel 110.

The plurality of tread grooves 130 may include a plurality of first tread grooves 131 that open toward the first sidewall 113, which is one side surface of the outer wheel 110, and a plurality of second tread grooves 133 that open toward the second sidewall 114, which is the other side surface of the outer wheel 110, based on the axial direction of the outer wheel. The plurality of first tread grooves 131 and the plurality of second tread grooves 133 may be formed alternately.

Each of the plurality of first tread grooves 131 may include a first opening 132 on one side that opens toward the first sidewall 113. Each of the plurality of first tread grooves 131 may be formed with the other side of the first opening 132 sloping at its end portion in an axial direction of the outer wheel 110. The end portion of each of the plurality of first tread grooves 131, which is the other side of the first opening 132, may be formed to be inclined to have a slope corresponding to an end portion of a deforming groove 140. This will be described below.

Each of the plurality of second tread grooves 133 may include a second opening 134 on one side that opens toward the second sidewall 114. Each of the plurality of second tread grooves 133 may be formed with the other side of the second opening 134 sloping at its end portion in the axial direction of the outer wheel 110. The end portion of each of the plurality of second tread grooves 133, which is the other side of the second opening 134, may be formed to be inclined to have a slope corresponding to the end portion of the deforming groove 140. This will be described below.

The outer wheel 110 may include a plurality of deforming grooves 140 formed by partially cutting the outer wheel 110 in the axial direction of the outer wheel 110. When the robot cleaner climbs over an obstacle such as a threshold, as the obstacle is partially accommodated in one of the plurality of tread grooves 130, the outer wheel 110 is deformed by the deforming groove 140 formed at a position corresponding to the tread groove 130 in which the obstacle is partially accommodated, and thus the outer wheel 110 can easily climb over the obstacle. A deformed amount of the outer wheel 110 may be limited to as much as a height of the deforming groove 140.

In order for the robot cleaner to easily climb over an obstacle such as a threshold, it may be advantageous for the tread patterns formed on the tread 111 to be formed not to be connected instead of being connected in the circumferential direction. When the robot cleaner climbs over the obstacle, the robot cleaner may receive a reaction force from the obstacle in each of a horizontal direction and a vertical direction. In order for the robot cleaner to climb over the obstacle, a grip force of the outer wheel 110 may be greater than the reaction force of the obstacle in the horizontal direction. When the robot cleaner does not have a grip force of the outer wheel 110 that is greater than the reaction force of the obstacle in the horizontal direction, the outer wheel 110 slips on the spot, and thus it may be difficult for the robot cleaner to climb over the obstacle. When the tread patterns formed on the tread 111 are not connected in the circumferential direction instead of being connected, a grip force of the outer wheel 110 increases when the robot cleaner climb over the obstacle, and thus the robot cleaner can easily climb over the obstacle.

However, as described above, when the robot cleaner is used for wet cleaning, since the tread patterns 120 are formed to be connected in the circumferential direction of the tread 111 to improve travel performance without slipping, the plurality of deforming grooves 140 may be formed in the outer wheel 110 in order to achieve the same effect as when the tread patterns 120 are formed not to be connected in the circumferential direction instead of being connected, when the robot cleaner climbs over an obstacle such as a threshold. That is, when the robot cleaner climbs over an obstacle such as a threshold, as the obstacle is partially accommodated in one of the plurality of tread grooves 130, the deforming groove 140 formed at the position corresponding to the tread groove 130 in which the obstacle is partially accommodated may be deformed. When the deforming groove 140 is deformed, there may be an effect of forming the tread groove 130 in the entire tread 111 at a position at which the tread groove 130 is formed in the axial direction of the outer wheel 110. That is, when the robot cleaner climbs over an obstacle, there is an effect that the tread groove 130, in which the obstacle is partially accommodated, extends as much as the width of the tread 111, and thus the tread patterns 120 may not be connected in the circumferential direction. Accordingly, the robot cleaner can easily climb over the obstacle such as the threshold.

The plurality of deforming grooves 140 may be formed in the first and second sidewalls 113 and 114 at positions corresponding to the plurality of tread grooves 130 in the axial direction of the outer wheel 110. That is, the plurality of deforming grooves 140 may be formed in the first and second sidewalls 113 and 114 at positions corresponding to the first tread groove 131 and the second tread groove 133 in the axial direction of the outer wheel 110. In the plurality of tread grooves 130, since the plurality of first tread grooves 131 and the plurality of second tread grooves 133 are alternately formed, the plurality of deforming grooves 140 may be formed in both the side surfaces of the outer wheel 110. That is, the plurality of deforming grooves 140 may be formed in the first sidewall 113 and the second sidewall 114, respectively. Accordingly, when the robot cleaner climbs over an obstacle such as a threshold, the outer wheel 110 may be deformed toward only one side of both the side surfaces of the outer wheel 110 at which the deforming groove 140 is formed.

The plurality of deforming grooves 140 may be formed to extend in the axial direction of the outer wheel 110 to have a length shorter than half of the width of the outer wheel 110. That is. since the plurality of deforming grooves 140 are formed at the positions corresponding to the plurality of tread grooves 130 in the axial direction of the outer wheel 110, the plurality of deforming grooves 140 may be formed to have a length shorter than half of the width of the outer wheel 110 due to the plurality of tread grooves 130 formed to extend to be longer than half of the width of the outer wheel 110. Accordingly, as a length of each of the plurality of deforming grooves 140 extending in the axial direction of the wheel 100 increases, the length of each of the plurality of tread grooves 130 extending in the axial direction of the wheel may decrease. As the length of each of the plurality of deforming grooves 140 extending in the axial direction of the wheel 100 decreases, climbing performance of the robot cleaner which climbs over an obstacle such as a threshold can be improved. As the length of each of the plurality of deforming grooves 140 extending in the axial direction of the wheel 100 increases, travel performance of the robot cleaner can be improved.

The length of each of the plurality of deforming grooves 140 in the circumferential direction of the outer wheel 110 may be greater than or equal to the length of each of the plurality of tread grooves 130 in the circumferential direction.

An end portion of each of the plurality of deforming grooves 140 in the axial direction of the outer wheel 110 may be formed to be inclined so that a height of the end portion from a lower surface of each of the plurality of deforming grooves 140 decreases gradually. Accordingly, when the robot cleaner climbs over an obstacle such as a threshold, a supporting force of the obstacle supporting the wheel 100 may increase. Since the plurality of deforming grooves 140 are formed at the positions corresponding to the plurality of tread grooves 130, an end portion of the other side of each of the plurality of tread grooves 130 in the axial direction of the outer wheel 110 may be formed to be inclined to have a slope corresponding to the end portion of each of the plurality of deforming grooves 140.

The plurality of deforming grooves 140 may be formed not to intersect the shoulder 115. That is, the plurality of the deforming grooves 140 formed in the first and second sidewalls 113 and 114 may be formed under the shoulder 115 not to intersect the shoulder 115.

Each of the plurality of deforming grooves 140 may be formed to have a quadrangular cross section. That is, when viewed from the side surface of the wheel 100, each of the plurality of deforming grooves 140 may be formed in a quadrangular shape.

Figure 8:
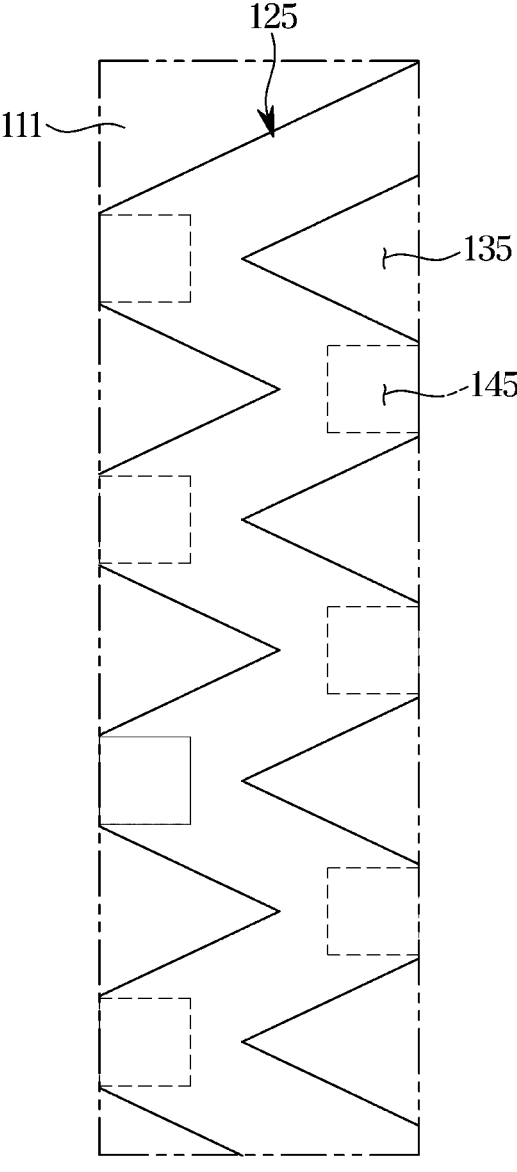
FIG. 8 is a view illustrating tread grooves each formed in a triangular shape according to one embodiment.
Figure 9:
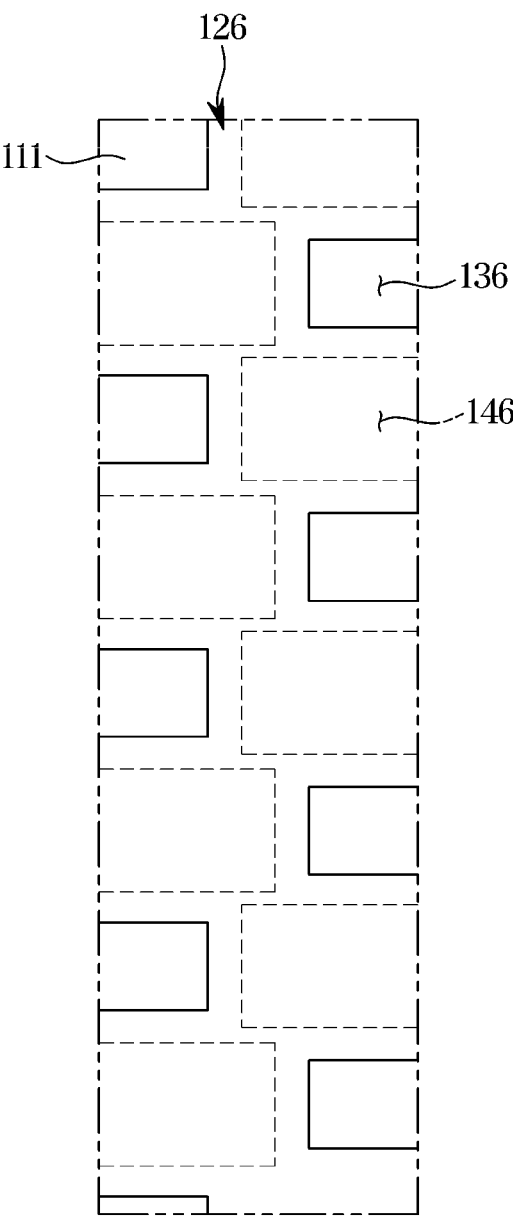
FIG. 9 is a view illustrating tread grooves each extending to have a length shorter than half of a width of an outer wheel according to one embodiment.
Figure 10:
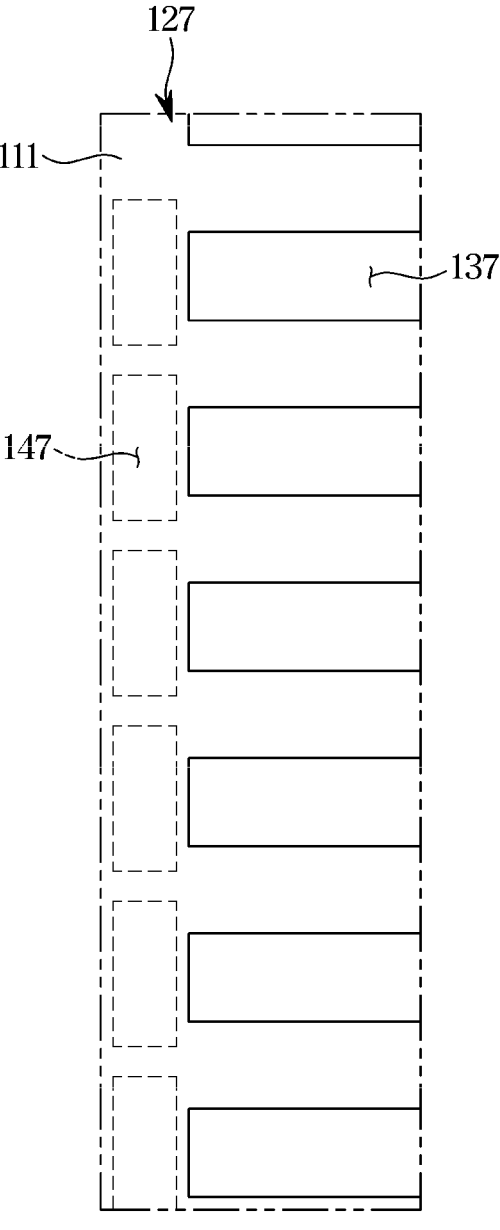
FIG. 10 is a view illustrating tread grooves that all open toward one side surface of an outer wheel according to one embodiment.

FIG. 8 is a view illustrating tread grooves each formed in a triangular shape according to one embodiment. FIG. 9 is a view illustrating tread grooves each extending to have a length shorter than half of a width of an outer wheel according to one embodiment. FIG. 10 is a view illustrating tread grooves that all open toward one side surface of an outer wheel according to one embodiment.

As illustrated in FIG. 8, tread grooves 135 may each be formed in a triangular shape. As the tread groove 135 is formed in the triangular shape, a shape of a tread pattern 125 is different from the shape of the tread pattern 120 illustrated in FIGS. 4 and 5, but only the shape is different therefrom, and all the other structure may be the same. In addition, although a shape of a deforming groove 145 may be partially different from that of the deforming groove 140 illustrated in FIGS. 4 and 5, all the other structure may be the same.

As illustrated in FIG. 9, tread grooves 136 are each formed in a quadrangular shape, and a length of the tread groove 136 in an axial direction of an outer wheel 110 may be smaller than half of a width of the outer wheel 110 compared to the tread groove 130 illustrated in FIGS. 4 and 5. A length of a deforming groove 146 in the axial direction of the outer wheel 110 may increase as much as a decrease in the length of the tread groove 136 in the axial direction of the outer wheel 110. That is, the length of the deforming groove 146 in the axial direction of the outer wheel 110 may be greater than half of the width of the outer wheel 110. Since the length of the tread groove 136 and the length of the deforming groove 146 in the axial direction of the outer wheel 110 are changed, a shape of a tread pattern 126 is also different from that of the tread pattern 120 illustrated in FIGS. 4 and 5, but a structure in which the tread pattern 126 is connected to a tread 111 in a circumferential direction of the outer wheel 110 may be the same.

As illustrated in FIG. 10, all tread grooves 137 may be formed to open toward one side surface of an outer wheel 110. That is, when compared to the tread groove 130 illustrated in FIGS. 4 and 5, all the tread grooves 137 may be formed to open toward only one side surface of the outer wheel 110 instead of being formed to alternately open toward both side surfaces of the outer wheel 110. Since positions at which the tread grooves 137 are formed are changed, deforming grooves 147 may also be formed at positions on only one side surface of the outer wheel 110. In addition, although a shape of a tread pattern 127 is different from that of the tread pattern 120 illustrated in FIGS. 4 and 5, a structure in which the tread pattern 127 is connected to a tread 111 in a circumferential direction of the outer wheel 110 may be the same. In addition, in the drawing, a structure in which the tread grooves 137 open toward a right surface among both the side surfaces of the outer wheel 110 is illustrated, but the present disclosure is not limited thereto. That is, the tread grooves 137 may also be formed to open toward a left surface among both side surfaces of the outer wheel 110.

Figure 11:
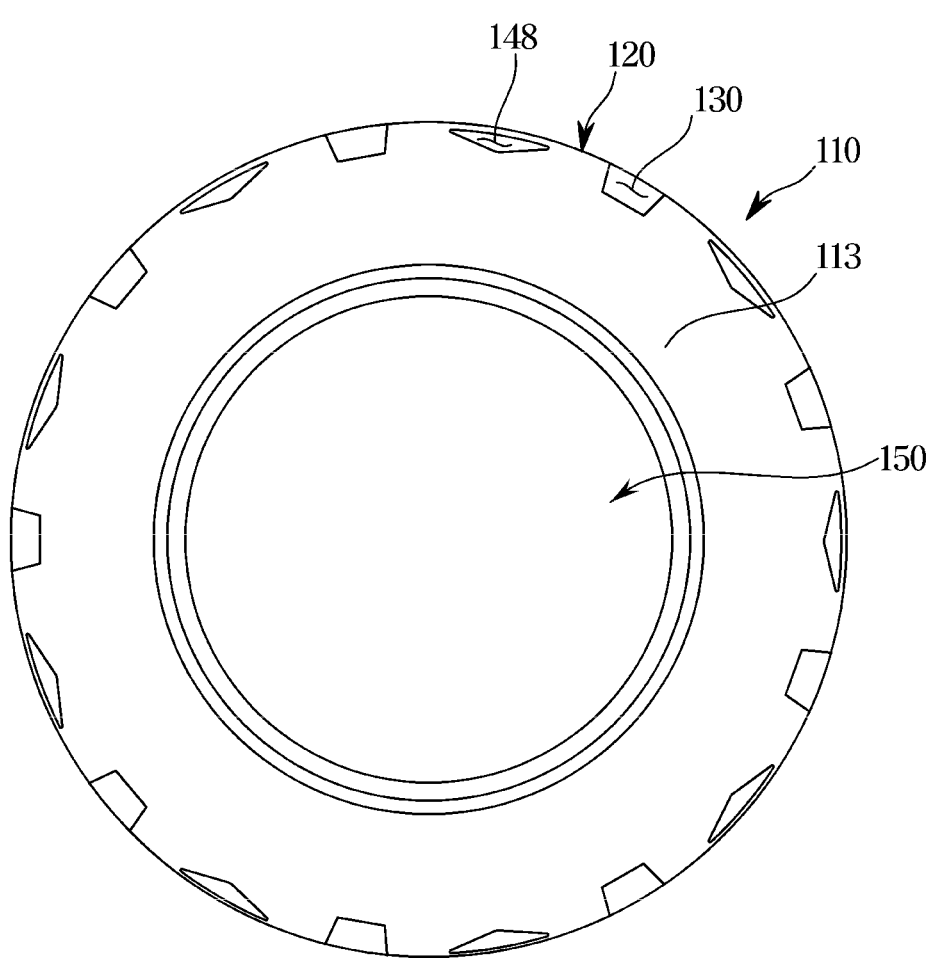
FIG. 11 is a view illustrating deforming grooves each formed to have a triangular cross section according to one embodiment.
Figure 12:
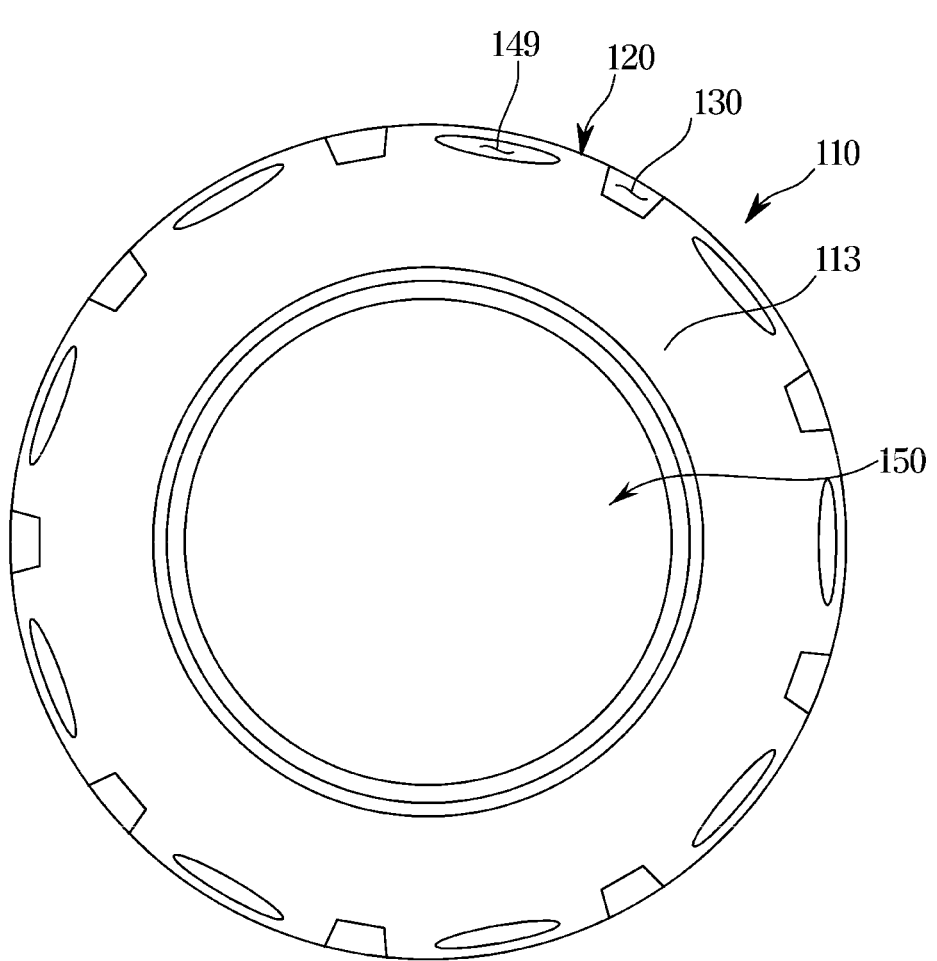
FIG. 12 is a view illustrating deforming grooves each formed to have an elliptical cross section according to one embodiment.

FIG. 11 is a view illustrating deforming grooves each formed to have a triangular cross section according to one embodiment. FIG. 12 is a view illustrating deforming grooves each formed to have an elliptical cross section according to one embodiment.

As illustrated in FIGS. 11 to 12, deforming grooves 148 may each be formed to have a triangular cross section, or deforming grooves 149 may each be formed to have an elliptic cross section. Although shapes of the deforming grooves 148 and 149 are different from the shape of the deforming groove 140 having the quadrangular cross section illustrated in FIG. 6, there is only a difference in shape, and all the rest of a structure may be the same.

According to embodiments of the disclosure, a tread of a wheel can always come into line contact with a cleaning target floor due to a pattern formed on the tread of the wheel, and thus high travel performance can be provided even in a situation in which a friction coefficient is low.

In addition, performance of easily climbing over an obstacle such as a threshold can be provided while a tread also always comes into line contact with a cleaning target floor in order to improve travel performance.

In addition, performance of easily climbing over an obstacle such as a threshold can be provided even without an additional function of detecting an obstacle such as a threshold.

In addition, performance of easily climbing over an obstacle such as a threshold can be provided even without an algorithm capable of climbing over an obstacle such as a threshold.

Effects that can be obtained from the present disclosure are not limited to the above-described effects and other unmentioned effects may be clearly understood by those skilled in the art from the above descriptions.

Specific shapes and specific directions of a robot cleaner have been described above with reference to the accompanying drawings, but the present disclosure may be variously modified and changed by those skilled in the art, and the modifications and changes should be interpreted as being included in the scope of the present disclosure.

What is claimed is:

1. A robot cleaner comprising:
   a main body; and
   a wheel installed on the main body and configured to be driven by a driving motor to move the main body,
   wherein the wheel includes:
   an outer wheel configured to come into contact with a cleaning target floor, the outer wheel including:
   a tread configured to come into contact with the cleaning target floor,
   a sidewall provided on both side surfaces of the tread, respectively, the sidewall including a first sidewall and a second sidewall,
   a plurality of tread grooves recessed in the tread and provided alternately with a side of a first tread groove of the plurality of tread grooves opening toward the first sidewall and a side of a second tread groove of the plurality of tread grooves opening toward the second sidewall, and
   a plurality of deforming grooves formed in the outer wheel in an axial direction of the outer wheel at positions respectively corresponding to the first tread groove and the second tread groove, wherein each tread groove of the plurality of tread grooves extends in the axial direction of the outer wheel to be longer than half of a width of the outer wheel, and an inner wheel installed in the outer wheel and configured to receive a driving force from the driving motor.

2. The robot cleaner of claim 1, wherein an end portion of each deforming groove of the plurality of deforming grooves in the axial direction of the outer wheel is inclined so that a height of the end portion from a lower surface of the deforming groove of the plurality of the-deforming grooves decreases gradually.

3. The robot cleaner of claim 2, wherein the first tread groove includes a first opening on the side that opens toward the first sidewall and the second tread groove includes a second opening on the side that opens toward the second sidewall.

4. A robot cleaner comprising:

a main body; and a wheel installed on the main body and configured to be driven by a driving motor to move the main body, wherein the wheel includes:

an outer wheel configured to come into contact with a cleaning target floor, the outer wheel including:

a tread configured to come into contact with the cleaning target floor, a sidewall provided on both side surfaces of the tread, respectively, the sidewall including a first sidewall and a second sidewall, a plurality of tread grooves recessed in the tread and provided alternately with a side of a first tread groove of the plurality of tread grooves opening toward the first sidewall and a side of a second tread groove of the plurality of tread grooves opening toward the second sidewall, and a plurality of deforming grooves formed in the outer wheel in an axial direction of the outer wheel at positions respectively corresponding to the first tread groove and the second tread groove, and an inner wheel installed in the outer wheel and configured to receive a driving force from the driving motor, wherein an end portion of each deforming groove of the plurality of deforming grooves in the axial direction of the outer wheel is inclined so that a height of the end portion from a lower surface of the deforming groove of the plurality of deforming grooves decreases gradually, wherein the first tread groove includes a first opening on the side that opens toward the first sidewall and the second tread groove includes a second opening on the side that opens toward the second sidewall, wherein, in the first tread groove and the second tread groove, an end portion of an other side of the first opening and an other side of the second opening, in the axial direction of the outer wheel, is inclined to have a slope corresponding to the end portion of each deforming groove of the plurality of deforming grooves, respectively.

5. The robot cleaner of claim 1, wherein the plurality of deforming grooves are formed in the first sidewall and the second sidewall, respectively.

6. The robot cleaner of claim 5, wherein, among the plurality of deforming grooves, a deforming groove formed at a position corresponding to the first tread groove is formed in the second sidewall, and a deforming groove formed at a position corresponding to the second tread groove is formed in the first sidewall.

7. The robot cleaner of claim 1, wherein a length of each deforming groove of the plurality of deforming grooves in a circumferential direction of the outer wheel is greater than a length of each tread groove of the plurality of tread grooves in the circumferential direction.

8. The robot cleaner of claim 1, wherein each deforming groove of the plurality of deforming grooves extends in the axial direction of the outer wheel to have a length shorter than half of a width of the outer wheel.

9. The robot cleaner of claim 1, wherein the outer wheel is deformable due to each deforming groove of the plurality of deforming grooves formed at a position corresponding to each tread groove of the plurality of tread grooves, so that an obstacle is partially accommodatable in the tread groove while the wheel climbs over the obstacle.

10. The robot cleaner of claim 9, wherein the outer wheel is deformable toward only one side of both side surfaces of the outer wheel at which the deforming groove is formed.

11. The robot cleaner of claim 1, wherein:

the outer wheel includes a shoulder at which the first and second sidewalls are changed to the tread; and the plurality of deforming grooves are formed not to intersect the shoulder.

12. The robot cleaner of claim 1, wherein each of the plurality of tread grooves is formed to have a quadrangular shape.

13. The robot cleaner of claim 1, wherein each of the plurality of tread grooves is formed to have a triangular shape.

14. The robot cleaner of claim 1, wherein each of the plurality of deforming grooves is formed to have a quadrangular cross section.

15. A robot cleaner comprising:

a main body; and a wheel installed on the main body and configured to be driven by a driving motor to move the main body, wherein the wheel includes:

a tread configured to come into contact with a cleaning target floor, a sidewall provided on both side surfaces of the tread, respectively, the sidewall including a first sidewall and a second sidewall, a plurality of tread grooves recessed in the tread and provided alternately with a side of a first tread groove of the plurality of tread grooves opening toward the first sidewall and a side of a second tread groove of the plurality of tread grooves opening toward the second sidewall, and a plurality of deforming grooves formed in both side surfaces of the wheel in an axial direction of the wheel and formed at positions respectively corresponding to the plurality of tread grooves in the axial direction of the wheel, wherein:

an end portion of each deforming groove of the plurality of deforming grooves in the axial direction of the wheel is inclined so that a height of the end portion decreases gradually; and each tread groove of the plurality of tread grooves is formed so that a side of the tread groove opens in the axial direction of the wheel, and an end portion of an other side of the tread groove in the axial direction of the wheel is formed to be inclined to have a slope corresponding to the end portion of the deforming groove.

16. The robot cleaner of claim 15, wherein the plurality of deforming grooves are formed in the first sidewall and the second sidewall, respectively.

17. The robot cleaner of claim 15, wherein, as a length of each deforming groove of the plurality of deforming grooves extending in the axial direction of the wheel increases, a length of each tread groove of the plurality of tread grooves extending in the axial direction of the wheel decreases.

18. The robot cleaner of claim 15, wherein, based on a circumferential direction of the wheel, a length of each deforming groove of the plurality of deforming grooves is greater than or equal to a length of each tread groove of the plurality of tread grooves.

\* \* \* \* \*